United States Patent [19]

Huard

[11] Patent Number: 4,682,472
[45] Date of Patent: Jul. 28, 1987

[54] COUPLING DEVICE FOR TUBES, TUBULAR ELBOWS AND END PLATES OF THERMOELECTRIC DEVICES

[75] Inventor: Jean-Francois Huard, Pont-A-Mousson, France

[73] Assignee: Tunzini Nessi Entreprises d'Equipements, Rueil Malmaison, France

[21] Appl. No.: 768,713

[22] Filed: Aug. 23, 1985

[30] Foreign Application Priority Data

Aug. 27, 1984 [FR] France ................. 84 13330

[51] Int. Cl.[4] .............. F25B 21/02; H01L 35/28
[52] U.S. Cl. ................................. 62/3; 165/76; 165/78; 136/204; 136/212
[58] Field of Search ............ 62/3; 136/204, 208, 136/212; 165/76, 78

[56] References Cited

U.S. PATENT DOCUMENTS

| | | | |
|---|---|---|---|
| 3,167,926 | 2/1965 | Wepfer et al. | 62/3 |
| 3,178,894 | 4/1965 | Mole et al. | 62/3 |
| 3,178,895 | 4/1965 | Mole et al. | 136/204 |
| 3,196,620 | 7/1965 | Elfving et al. | 136/204 |
| 3,205,667 | 9/1965 | Frantti | 62/3 |
| 3,290,177 | 12/1966 | Mole et al. | 136/212 |
| 3,560,027 | 2/1971 | Graham | 285/158 |
| 4,420,940 | 12/1983 | Buffet | 62/3 |
| 4,499,329 | 2/1985 | Benicourt et al. | 62/3 |

Primary Examiner—Albert W. Davis, Jr.
Assistant Examiner—John K. Ford
Attorney, Agent, or Firm—Larson and Taylor

[57] ABSTRACT

A lockable, mechanically secure coupling is provided for heat exchanger tubes which are connected together by end plates into superimposed layers (A or B) to form hydraulic connections between the extremities of two tubes (1) using tubular elbows (3). Each tubular elbow (3) has a coupling member (5) connected to the extremities thereof by welding, brazing or glueing to form a coupling flange. The subassembly comprising an elbow with its coupling member (5) is received in a countersunk recess (10) in the external face of the end plate and is mechanically locked by pairs of straight pins (13) which extend into spaced parallel bores (12) or (15), disposed orthogonally to the axis (XX) of the tubes (1), each pin (13) being received in an external semicircular groove (9) of the coupling member (5). The invention provides a tight, mechanically sound joint for the hydraulic connections between tubular heat exchangers used in thermoelectric devices employed as heat pumps or as electrical generators.

12 Claims, 8 Drawing Figures

COUPLING DEVICE FOR TUBES, TUBULAR ELBOWS AND END PLATES OF THERMOELECTRIC DEVICES

FIELD OF THE INVENTION

The present invention relates to a coupling device or assembly for providing tight coupling between the tubes, tubular elbows and end plates used in thermoelectric devices which are adapted to operate either as heat pump or as electrical generator.

BACKGROUND OF THE INVENTION

A thermoelectric device comprises two fluid circuits (a warm circuit and a cold circuit) between which are placed the thermoelectric elements (also referred to here as "thermoelements" for shorthand purposes), with at least one of these fluid circuits being a liquid circuit using parallel tubular pipes assembled in a stacked arrangement.

According to a known device, the thermoelements are placed in contact with tubular heat exchangers disposed in alternate layers in which warm and cold fluids flow, these layers being stacked one above the other and secured together to provide an assembly.

The present invention is concerned with providing a tight coupling assembly or joint for tubular elbows connected to the extremities of the tubes of the same layer of heat exchangers (containing the same warm or cold fluid) or between different layers for the same fluid, i.e., between two layers for warm fluid or two layers for cold fluid.

The problem of joining such elbows and other fluid connections to the layers of heat exchangers is difficult to solve.

It can be solved by brazing or welding of the elbows on the extremities of the heat exchanger tubes of the assembly.

Nevertheless, a joint provided by brazing or welding dictates that the brazing or welding operation is feasible using materials (metal tubes and elbows, and a filler metal solder) which are acceptable for the operating conditions (i.e, factors such as stability, corrosion by the fluids, toxicity and the like). Sometimes special welding is required for some metals like stainless steels. In either case, providing such a connection is a delicate operation because the heat exchanger assembly is compact and the tubes are arranged with the minimum possible spacing. Very little space is thus available for brazing or welding, and a perfectly tight weld must be provided around the entire periphery of a tubular section. Moreover, the heating of the tubular members attendant such a welding or brazing operation can damage components of the thermoelectric device, this heat being transferred by conduction along the heat exchanger tubes to the basic assembly.

It has been proposed to provide, by brazing, connection of the components of a layer to a counterplate secured by screws or bolts on the end plate itself. It will be understood that the connections between layers of the same kind (cold or warm) must be adjusted because of expansion and contraction of the layers of the same kind (cold or warm) after the counterplate is in place, and to this end, screws or bolts must be disposed at accessible places for tightening the connections. Such adjustments are very difficult for connecting elbows in the same layer. Another disadvantage is the trend toward curvature of the counterplates where the hydraulic connections are brazed, which can require adjustment of the support surface in order to obtain the required tightness of the joint. Moreover, this adjustment requires the presence of a toric ring seal disposed in a groove provided in either the end plate or the counterplate.

SUMMARY OF THE INVENTION

According to the invention, problems such as those discussed above are solved by the provision of an improved mechanical connection between the tube assembly and the connecting elbows for the heat exchanger tubes of the assembly.

In accordance with the present invention, a coupling assembly or device is provided for producing a tight connection between a tube, a tubular elbow and an end plate, used in a thermoelectric device of the type comprising a plurality of thermoelements cooperating with heat exchangers associated with tubes disposed in alternate superimposed layers in which respective warm and cold fluids flow. At least one of the fluids is a liquid which flows through a continuous tube associated thermally with the thermoelements, and the tubes as supported in the aforesaid alternate superimposed layers by end plates disposed near the extremities of the tubes so that the tubes extend therethrough. The coupling assembly comprises a coupling member disposed between each tube and the corresponding end plate, and a tubular elbow member for providing connection of one tube to another tube. Each tube is received in a coupling member in fluid tight relationship therewith and extends at least partially through the coupling member. Further, the coupling member is itself received in a countersunk recess in the corresponding end plate and includes groove means in the external surface thereof. The coupling assembly further comprises a pair of straight, elongate pins, disposed in spaced, parallel relationship on opposite sides of the coupling member, which cooperate with the groove means of the coupling member to provide locking of the coupling member in the countersunk recess in the end plate so as to prevent both rotation and translation of the coupling member.

Each end plate preferably includes at least one pair of straight bores of semicircular cross section disposed in spaced parallel relationship for receiving respective ones of the locking pins, each of the bores mating with an external groove or slot of semicircular cross section in the periphery of the coupling member to form an opening or bore of circular cross section in which the locking pin is received.

The locking pins of a coupling assembly preferably extend orthogonally to the plane containing the axis of the tubes of the same layer and act with respect to a plurality of stacked layers to simultaneously lock a plurality of vertically aligned coupling members.

In another advantageous embodiment, the pins for locking a coupling member onto an end plate extend parallel to a plane containing the axes of the tubes of the same layer and act simultaneously in connection with the entire layer to lock all of the horizontally aligned coupling members the pins being received in straight bores having axes extending parallel to the plane containing the axes of the tubes.

In accordance with a preferred embodiment, the external semicircular groove of a coupling member extends around the entire circular periphery thereof. According to another preferred embodiment, the external semicircular groove in which a locking pin is received, comprises a straight slot and two of these slots are disposed in parallel, diametrically opposed relationship which mate with, and complete an opening of circular cross section with, the semicircularly shaped straight bores in the locking plate, for receipt of the pins.

Advantageously, the coupling member further comprises an inner groove chamber for receiving an O-ring seal which is radially compressed between the coupling member and a tube connected to the coupling member and extending at least partially therethrough. Further, an extremity of a tubular elbow is received in a sleeve portion of the coupling member. In one embodiment, a first subassembly is provided comprising a tubular elbow and a pair of coupling members secured to the elbow at the ends thereof to form flanges and a second subassembly is provided comprising two tubes connected to the same end plate. The tubular elbow providing the connection between the latter two tubes is a S-shaped connection connected at its ends to tubes associated with different end plates of different layers and providing a "twisted" inlet or outlet flow connection for an intermediate layer.

With the coupling device of the invention, the required tightness is provided between tubes and connecting elbows.

Moreover, the above-mentioned disadvantages associated with welding or brazing are eliminated and it is possible to securely mount all the kinds of hydraulic connections necessary for the assembly, viz., inputs and outputs for fluids, elbows in the same layer and connecting elbows between layers of the same kind.

That invention also enables easy and fast disassembly of the hydraulic connections, e.g., to permit the exchange of damaged ring seals or to enable cleaning of the heat exchanger tubes.

Other characteristics and advantages will be set forth in or apparent from the following description.

BRIEF DESCRIPTION OF THE DRAWINGS

In the accompanying drawings, given only as an example.

DESCRIPTION OF THE PREFERRED EMBODIMENTS

Figure 2:
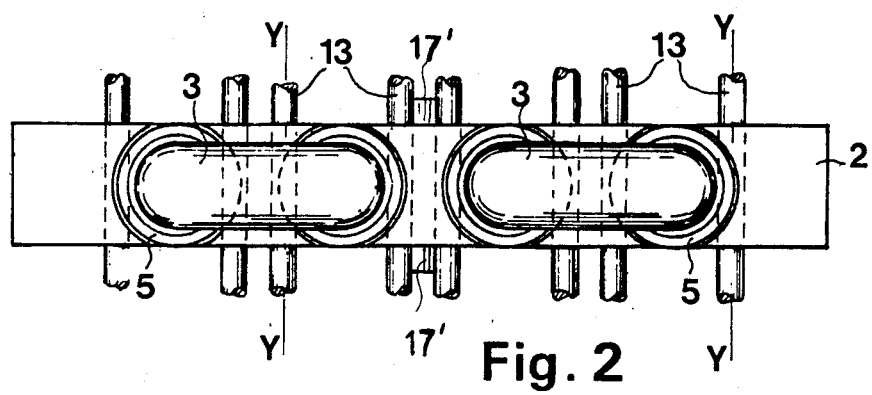
FIG. 2 is a front view of hydraulic connections of one layer of the embodiment according to FIG. 1, showing the end plate for connecting the heat exchanger tubes into a layer.

According to the embodiment of the invention shown in FIGS. 1 to 6, an assembly is provided for use in a thermoelectric device comprising a bank of tubes with layers A of "warm" tubes (i.e., tubes wherein the fluid to be heated flows) and layers B of "cold" tubes, (i.e., tubes wherein the fluid to be cooled flows). The layers A and B are alternately superimposed one upon the other.

Each layer comprises heat exchanger tubes 1, the tubes 1 extending parallel to an axis XX and being fastened together by end plates 2.

In the same layer A or B (FIGS. 1 and 2), two successive tubes 1 must be connected at their ends or extremities by tubular elbows which themselves must be connected to end plate 2 and to tubes 1, according to the invention. These assemblies are also simply referred to as "hydraulic connections" in the following description. These components can all be, but are not necessarily, made of metal.

The invention applies also to S-shaped or multi-cranked tubular connections 4 connecting two end tubes of two successive layers of the same kind, for example A, such tubes being located in two separate levels or layers separated by an intermediate layer B. The elbows 3 and a multicranked connection 4 are shown in chain lines in FIG. 6. As it can be seen, a S-shaped connection is provided to "twist" or reorient the connection between the two ends of such S-shaped connections, and the twisted connection can be either an inlet or outlet for fluid (as in FIG. 6), or an elbow located in the intermediate layer, or another S-shaped connection.

According to the invention, the mechanical coupling or connection provided between an elbow 3 or an S-shaped connection 4 and two exchanger tubes 1 and an end plate 2 is made as following, as indicated in FIGS. 1 to 4.

The connecting or coupling assembly of the invention comprises a coupling member 5, of metallic or other material, which is fastened to an elbow 3 or an S-shaped connection 4 to form a coupling flange, as well as to an end plate 2.

Each coupling member 5 includes a central bore or hole 6 and an inner groove chamber 7 adapted to receive an O-ring seal 8, which provides the require sealing tightness by compression around thereof a tube 1 of the thermoelectric device. Each tube 1 projects beyond the end plate 2, which enables connection of the tube 1 in the same layer A or B. It will be appreciated that each tube 1 supports several heat exchanger members of a known type (not shown).

The coupling member or coupling flange 5 is received in circular or cylindrical countersunk holes or recesses 10 which are shaped to accomodate members 5 and are provided in the external face of end plate 2. The countersunk holes 10 are concentric with tubes 1 and thus the longitudinal axis thereof, like that of the coupling members 5, is the same parallel axis XX.

Figures 3, 4, 5:
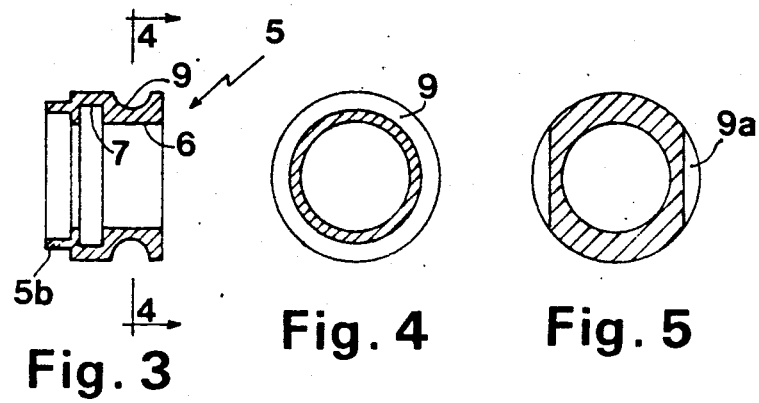
FIG. 3 is a an axial cross sectional view of a coupling device or member used for providing a tight joint, according to the invention, between an end plate, a heat exchanger tube and an elbow, according to the embodiment of FIG. 1.
FIG. 4 is a cross sectional view of the coupling device taken along the line 4—4 of FIG. 3.
FIG. 5 is a cross sectional view, similar to that of FIG. 4, of a modification of the coupling device for the assembly according to the invention.

Each coupling member 5 also includes an external groove 9, the profile of which is almost a complete half-circle as shown in FIG. 3. The external groove 9 can either extend around the entire circular periphery of the member 5 as shown in FIG. 4, or around a portion thereof. In the latter embodiment, as shown in FIG. 5, two diametrically opposed straight slots 9a, are provided which mate with a semicircular bore 12 provided in end plate 12, each bore 12 being completed by a slot 9a to form a circular cross section bore or opening corresponding to the circular cross section of a locking pin 13. The straight bores 12 and pins 13 are described in more detail below. The two slots 9a, which are mutually parallel, are provided at the intersections of cylinders with the coupling member 5. Each external groove 9 or 9a is provided, as stated, to form a part of a circular cross section duct or opening in association with a corresponding straight bore 12, the axis YY of which being orthogonal to axis XX and to the plane which contains axis XX. The bores 12 extend traversely to the end plate 2 and present an intersection with semicircular provided, in the plane of axis XX, in the cylindrical countersunk recesses 10 in end plate 2, so that the cylindrical pins 13 received in the bores 12 of end plate 2 serve to lock the coupling members 5, with the external semicircular groove 9, or the slots 9a, mating with the bores 12 of end plate 2, into the countersunk recesses 10. The members 5 and the end plate 2 are thus mechanically secured together but remain detachable.

Figure 6:
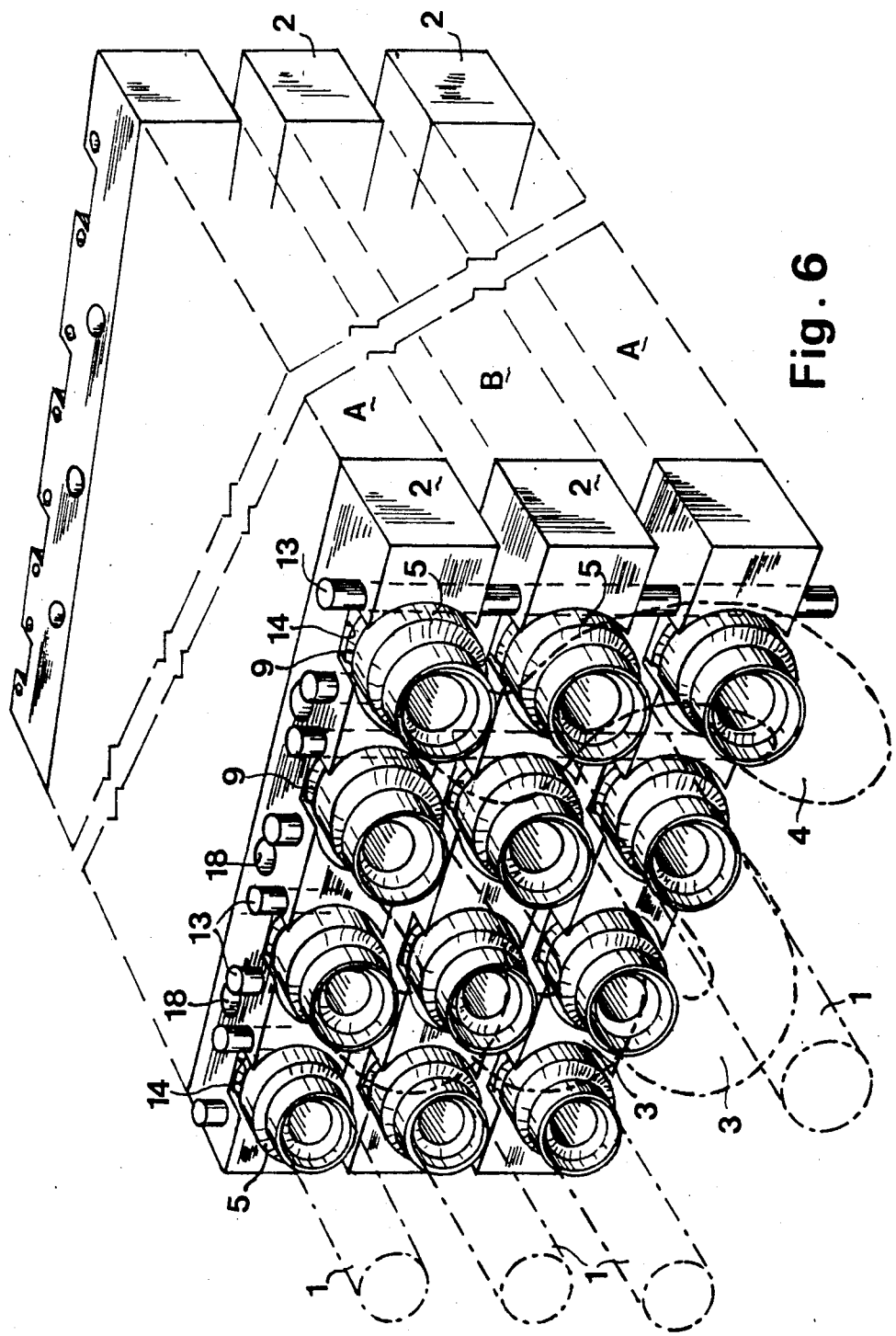
FIG. 6 is a partial, simplified, schematic perspective view of a thermoelectric device comprising three layers of tubes, showing the arrangement of hydraulic connections employing a coupling device according to the invention.

In FIG. 6, the active part of thermoelectric device is represented only by the volume thereof shown in dashed lines between the end plates 2 at the extremities of of layers A and B. The exemplary device under consideration comprises only three layers of tubes 1, two layers of type A with, for example, "cold" tubes, and a single layer of the other type B with, for example, "warm" tubes. This arrangement is, of course, merely exemplary, being the smallest unit which permits showing the diverse hydaulic connections between tubes 1. A device employing a larger number of layers A and B will obviously use the same hydraulic connections (i.e., those represented at 3 and 4).

FIG. 6 shows the face of the device which provides the inlet and outlet connections for the two liquids (cold and warm), the elbows 3, and here, a single, S-shaped connection 4 between the layers A of same type. For reasons of clarity, the elbows 3, the connection 4 and the inlet and outlet which constitute the hydraulic connections have been represented in chain lines. The hydraulic connections for the opposite face have not been shown but are all constituted by common elbows 3 for connecting tubes of the same layer A or B.

In the exemplary embodiment shown in FIGS. 1 to 6, it will be seen that the coupling members 5 have an external diameter nearly equal to the height of end plate 2. Consequently, the countersunk recesses 10, which are formed in the latter and must have a diameter slightly greater than that of members 5, terminate, in the upper and lower faces of end plate 2, in rectangular openings 14, the length of which is equal to the depth of recesses 10.

This arrangement results in a highly compact thermoelectric device, and it will be understood that compactness is often a very important consideration in practical applications.

Figure 7:
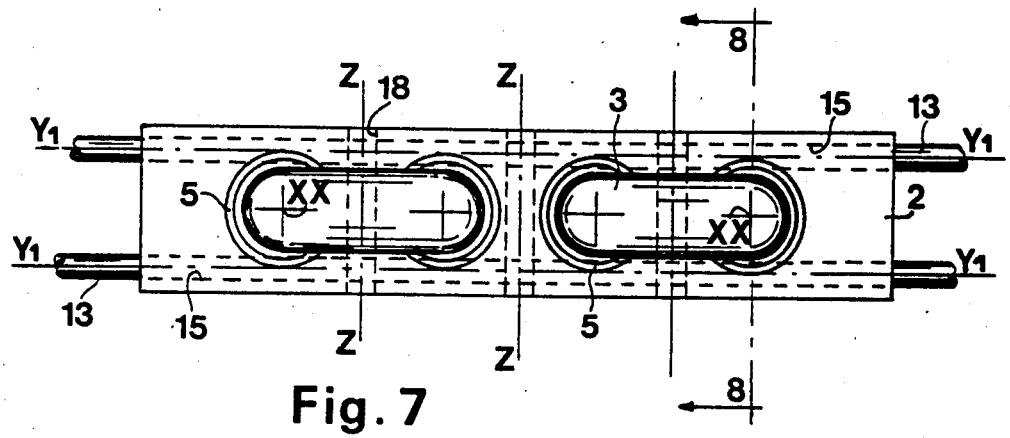
FIG. 7 is a front view, similar to that of FIG. 2, of a modification of hydraulic connections for an assembly according to the invention, showing the corresponding end plate.
Figure 8:
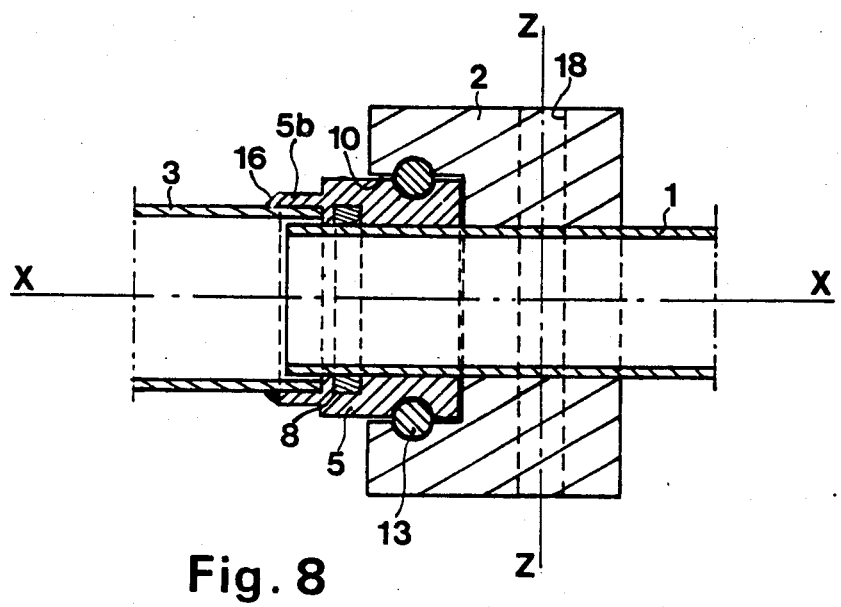
FIG. 8 is a schematic cross sectional view of a part of assembly of FIG. 7, taken generally along lines 8—8 of FIG. 7.

If the compactness is not an essential consideration, or if more height is available for any reason, the principle of invention can be employed in an embodiment such as shown in FIGS. 7 and 8.

According to modification of FIG. 7, an end plate 2 with countersunk recesses 10, which analogous to that described above, is provided with straight bores 15 having an axis Y1—Y1 parallel to the plane of axis XX of tubes 1 and orthogonal to axis XX. Pins 13 driven into bores 15 permit locking of the coupling members 5 by means of the semicircular grooves 9 formed in the coupling members.

The same principle is also employed in the embodiment of FIG. 8. FIG. 8 shows a coupling member 5 connected to an elbow 3 or another hydraulic connection by a brazing 16, the coupling members 5 being received in the countersunk openings 10 of the end plate 2 and being locked in position by the pins 13. A tight fit with tube 1 is provided by the O-ring seal 8.

The assembly of the hydraulic connections, elbows 3, S-shaped connections 4 or inlet/outlet connections, is carried out as follows:

The device is assembled by superposition of layers A, B of the tubes 1 bearing the heat exchanger, alternately with layers of thermoelectric material cooperating with the heat exchangers. The secure positioning of the stacks of tubes 1 with the heat exchangers in layers A and B is provided by pins 17 received in bores 18 with an axis ZZ orthogonal to the axis XX of tubes 1 (see FIGS. 1, 6, 7 and 8) and the packing thereof, for example, by known means not described here, consisting, for example, of threading of the extremities of pins 17 onto corresponding nuts indicated at 17' in FIG. 2, so the pins 17, which are not part of the coupling device according to the invention, act as tension rods.

In addition, the hydraulic connections (elbows 3, S-shaped members 4 and inlet/outlet connections) are prepared by affixing, to the extremities of such an elbow 3 or an S-shaped connection 4 or an inlet/outlet connections (FIG. 6), the coupling members 5, to form flanges using a brazing 16 provided beforehand, prior to the assembly thereof to the end plates 2. In other words, a subassembly comprising an elbow 3 or 4 and two coupling flanges 5 (one flange 5 is secured to each extremity of the elbow 3 or 4) is initially prepared for connection to another subassembly comprising two tubes 1 and an end plate 2 of the same layer A or B, or two tubes 1 of two end plates 2 of two different layers A or B.

In a modification of this embodiment of the invention, the brazing 16 may be replaced by a glueing or a welding. This phase of glueing, welding or brazing is advantageously carried out on an assembling jig, which assures the accuracy required for the elbows 3 or S-shaped connections 4.

The O-ring seals 8 are then placed in the inner groove 7 of the coupling members 5.

In the next step, an elbow 3 or an S-shaped connection 4 with a coupling flange 5 at each extremity (the sleeve portion 5b of which being brazed, welded or glued to the distal ends 16 of elbow 3 or connection 4) is joined to two extremities of tubes 1 by fitting each coupling flange 5 into a corresponding countersunk opening or recess 10. This is easy because there is a clearance fit between each flange 5 and each recess 10.

The last step comprises driving in of the pins 13 which providing locking or clamping of flanges 5 to the end plate 2. The driving of pins 13 into straight bores 12 through the (external) circular grooves 9 of each flange 5 is easy because the semicircular outline of each groove 9 is, as noted above, disposed in mating relation to a corresponding semi-circular groove in the recess 10 so as to form a complete bore of a circular cross section corresponding to that of each pin 13. In the case of parallel slots 9a, the fitting of pins 13 is also readily accomplished by alignment of slots 9a and straight bores 12.

Similar considerations apply when the straight bores 12, extending orthogonal to the plane of the axis XX, are replaced by bores 15 extending parallel to the plane of the axis XX at the same layer A or B (FIG. 7). In both the latter and the former case, each coupling flange 5 is received in a recess 10 of end plate 2 and mechanically locked in place on end plate 2, in recess 10, by a pair of straight, parallel pins 13 extending through the end plate 2 with half of the cross section thereof seated in the peripheral groove 9 or 9a in flange 5 so that flange 5 is locked in translation and rotation relative to end plate 2.

Figure 1:
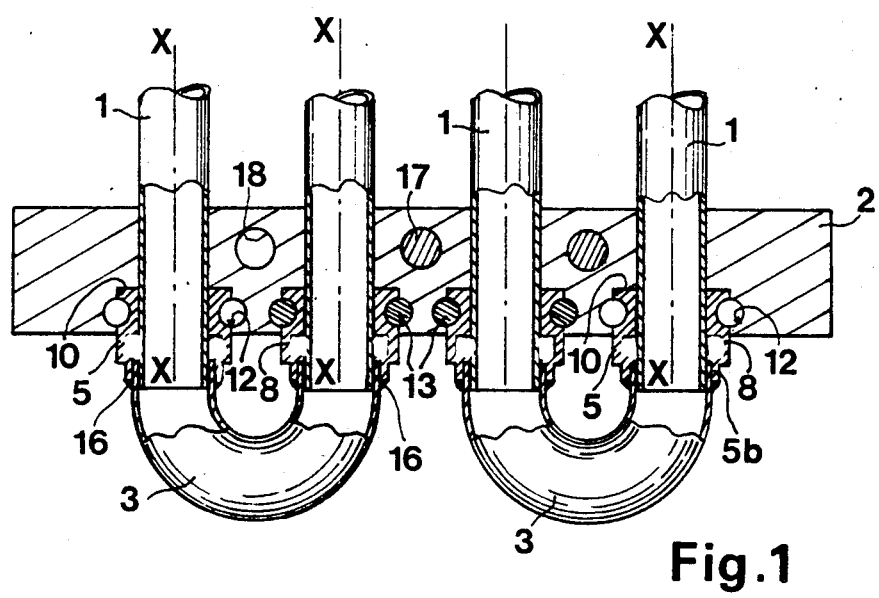
FIG. 1 is a top plan view, in partial section along the axis of the tubes, of a coupling or joining device according to the invention used in conhection with in a layer of heat exchanger tubes of a thermoelectric assembly.

The pins 13 can eventually be clamped on or otherwise secured to end plates 2, for example by glueing or by suitable mechanical means such as locking pins (not shown) extending through the pins 13 themselves. Each flange 5 is so locked on the end plate 2, between two parallel pins 13 in engagement with grooves 9 or 9a, in two diametrical opposed locations. Moreover, in the stacking or superimposition of layers A and B, a pair of vertical pins 13 lock several flanges 5, the axes XX of which being in the same vertical plane (FIGS. 1 and 6). In the embodiment of FIG. 7, a pair of horizontal pins 13 lock to end plate 2 several coupling flanges 5 belonging to the same layer A or B.

The present invention also enables one to provide in a suitable manner the hydraulic connections like elbows 3 and 4 and inlet/outlet connections essential to thermoelectric device to be assembled. The invention avoids the in situ brazing of elbow 3 or S-shaped connections 4 on the end plate 2. As noted, this operation is delicate one because of the lack of space between the tubes 1 on the external surfaces of end plates 2, particularly because a tight seal is required. An excellent seal is provided with the invention because of O-ring seals 8 and brazing 16, both provided before the final assembly of the subassemblies of flanges 5 and elbows 3 or S-shaped connections 4 with the end plates 2 of the tube layers A and B.

Even where glueing is used, this is a delicate operation for the same reason of lack of space, if the mechanical joint according to the invention, with flanges 5, recesses 10, grooves 9 or 9a, straight bores 12 or 15 and pins 13, is not used.

With the invention, assembly is limited to the subassemblies comprising flanges 5 and elbows 3 or S-shaped connections 4 on each end plate 2 and to the locking of each subassembly in place using pins 13.

The locked joint according to the invention is fluid tight for an internal pressure of the fluid flowing through the tubes 1 up to a value of 40 bars.

What is claimed:

1. A coupling assembly for providing coupling between a tube, a tubular elbow and an end plate, in a thermoelectric device of the type comprising a plurality of thermoelements cooperating with heat exchangers comprising a plurality of tubes in alternate superimposed layers in which respective warm and cold fluids flow, at least one of said fluids being a liquid flowing through a said tube cooperating thermally with at least one thermoelement, said tubes being supported in said alternate superimposed layers by a said end plate located near each of the extremities of said tubes, the tubes extending through the end plates, said coupling assembly comprising a coupling member coupled to an extremity of each tube, and a tubular elbow member for providing connection between an extremity of a first said tube and an extremity of a second said tube, said elbow member being connected to the coupling member coupled to the first tube and to the coupling member coupled to the second tube, each said tube being received in a said coupling member and extending at least partially therethrough, said coupling member being received in a countersunk recess in said end plate and including a groove means in the external surface thereof, and said coupling assembly further comprising means, comprising a pair of straight, elongate pins disposed in parallel relationship, for cooperating with said groove means of said coupling member to provide locking of said coupling member in said countersunk recess in said end plate so as to prevent translation of said coupling member.

2. A coupling assembly according to claim 1, wherein each end plate includes at least a pair of straight, parallel bores disposed in spaced relationship for receiving respective ones of said pins, each of said bores mating with a corresponding external groove or slot of semicircular cross section in the periphery of the coupling member.

3. A coupling assembly according to claim 2, wherein the locking pins of a coupling member extend orthogonal to a plane containing the axes of the tubes of the same layer and act simultaneously in connection with a plurality of stacked layers in order to lock a plurality of vertically aligned coupling members.

4. A coupling assembly according to claim 2, wherein the pins for locking a said coupling member on a said end plate are disposed so as to extend parallel to a plane containing the axes of the tubes of the same layer and act simultaneously in connection with the entire layer to lock all of the horizontally aligned coupling members, said pins being received in straight bores having axes extending parallel to the plane containing the axes of the tubes.

5. A coupling assembly according to claim 2, wherein the external semicircular groove of said coupling members extends around the entire circular periphery thereof.

6. A coupling assembly according to claim 2, wherein the semicircular groove in which a said locking pin is received, comprises a straight slot, and wherein two of said slots are disposed in parallel, diametrically opposed relationship, each of said slots mating with a said straight bore to complete an opening of circular cross section for receipt of a said pin.

7. A coupling assembly according to claim 1, wherein each coupling member comprises an inner groove chamber for receiving an O-ring seal which is radially compressed between said coupling member and a tube connected to the coupling member and extending at least partially therethrough, an extremity of a said tubular elbow being received in a sleeve of said coupling member.

8. A coupling assembly according to claim 1, wherein said assembly comprises a first subassembly comprising a said tubular elbow and a pair of said coupling members secured to the elbow at the ends thereof to form flanges and a second subassembly comprising two of said tubes connected to the same end plate.

9. A coupling assembly according to claim 1, wherein said assembly comprises a first subassembly comprising a said tubular elbow and a pair of said coupling members secured to the elbow at the ends thereof to form flanges and a second subassembly comprising two of said tubes connected to two different end plates of two different layers of the same kind.

10. A coupling assembly according to claim 3, wherein the tubular elbow providing the connection between two tubes is an S-shaped connection connected at its ends to tubes associated with different end plates of different layers and providing a twist inlet or outlet flow connection.

11. A coupling according to claim 3, wherein the tubular elbow providing the connection between two tubes is an S-shaped connection connected at its ends to tubes associated with different end plates of different layers and providing a twist inlet or outlet flow connection to an elbow associated with an intermediate layer.

12. A coupling assembly according to claim 1, wherein said tubes, tubular elbow and end plate are fabricated of metal.

* * * * *